United States Patent [19]
Grimble

[11] Patent Number: 4,729,931
[45] Date of Patent: Mar. 8, 1988

[54] REFORMING OF FUEL INSIDE FUEL CELL GENERATOR

[75] Inventor: Ralph E. Grimble, Finleyville, Pa.

[73] Assignee: Westinghouse Electric Corp., Pittsburgh, Pa.

[21] Appl. No.: 926,300

[22] Filed: Nov. 3, 1986

[51] Int. Cl.$^4$ ............... H01M 8/06; H01M 8/18; H01M 8/22

[52] U.S. Cl. ............... 429/17; 429/19; 429/20

[58] Field of Search ............... 429/17, 19, 20, 30, 429/31

[56] References Cited

U.S. PATENT DOCUMENTS

| | | | |
|---|---|---|---|
| 3,544,376 | 12/1970 | Connor, Jr. et al. | 429/17 |
| 3,669,750 | 6/1972 | Juda | 429/20 |
| 4,128,700 | 12/1978 | Sederquist | 429/17 |
| 4,365,007 | 12/1982 | Maru et al. | 429/19 |
| 4,374,184 | 2/1983 | Somers et al. | 429/17 |
| 4,395,468 | 7/1983 | Isenberg | 429/31 |
| 4,454,207 | 6/1984 | Fraioli et al. | 429/17 |
| 4,647,516 | 3/1987 | Matsumura et al. | 429/19 |

FOREIGN PATENT DOCUMENTS

| | | | |
|---|---|---|---|
| 59-119166 | 7/1983 | Japan | 429/17 |
| 59-119167 | 7/1983 | Japan | 429/17 |

Primary Examiner—Aaron Weisstuch
Attorney, Agent, or Firm—R. D. Fuerle

[57] ABSTRACT

Disclosed is an improved method of reforming a gaseous reformable fuel within a solid oxide fuel cell generator, wherein the solid oxide fuel cell generator has a plurality of individual fuel cells in a refractory container, the fuel cells generating a partially spent fuel stream and a partially spent oxidant stream. The partially spent fuel stream is divided into two streams, spent fuel stream I and spent fuel stream II. Spent fuel stream I is burned with the partially spent oxidant stream inside the refractory container to produce an exhaust stream. The exhaust stream is divided into two streams, exhaust stream I and exhaust stream II, and exhaust stream I is vented. Exhaust stream II is mixed with spent fuel stream II to form a recycle stream. The recycle stream is mixed with the gaseous reformable fuel within the refractory container to form a fuel stream which is supplied to the fuel cells.

Also disclosed is an improved apparatus which permits the reforming of a reformable gaseous fuel within such a solid oxide fuel cell generator. The apparatus comprises a mixing chamber within the refractory container, means for diverting a portion of the partially spent fuel stream to the mixing chamber, means for diverting a portion of exhaust gas to the mixing chamber where it is mixed with the portion of the partially spent fuel stream to form a recycle stream, means for injecting the reformable gaseous fuel into the recycle stream, and means for circulating the recycle stream back to the fuel cells.

13 Claims, 1 Drawing Figure

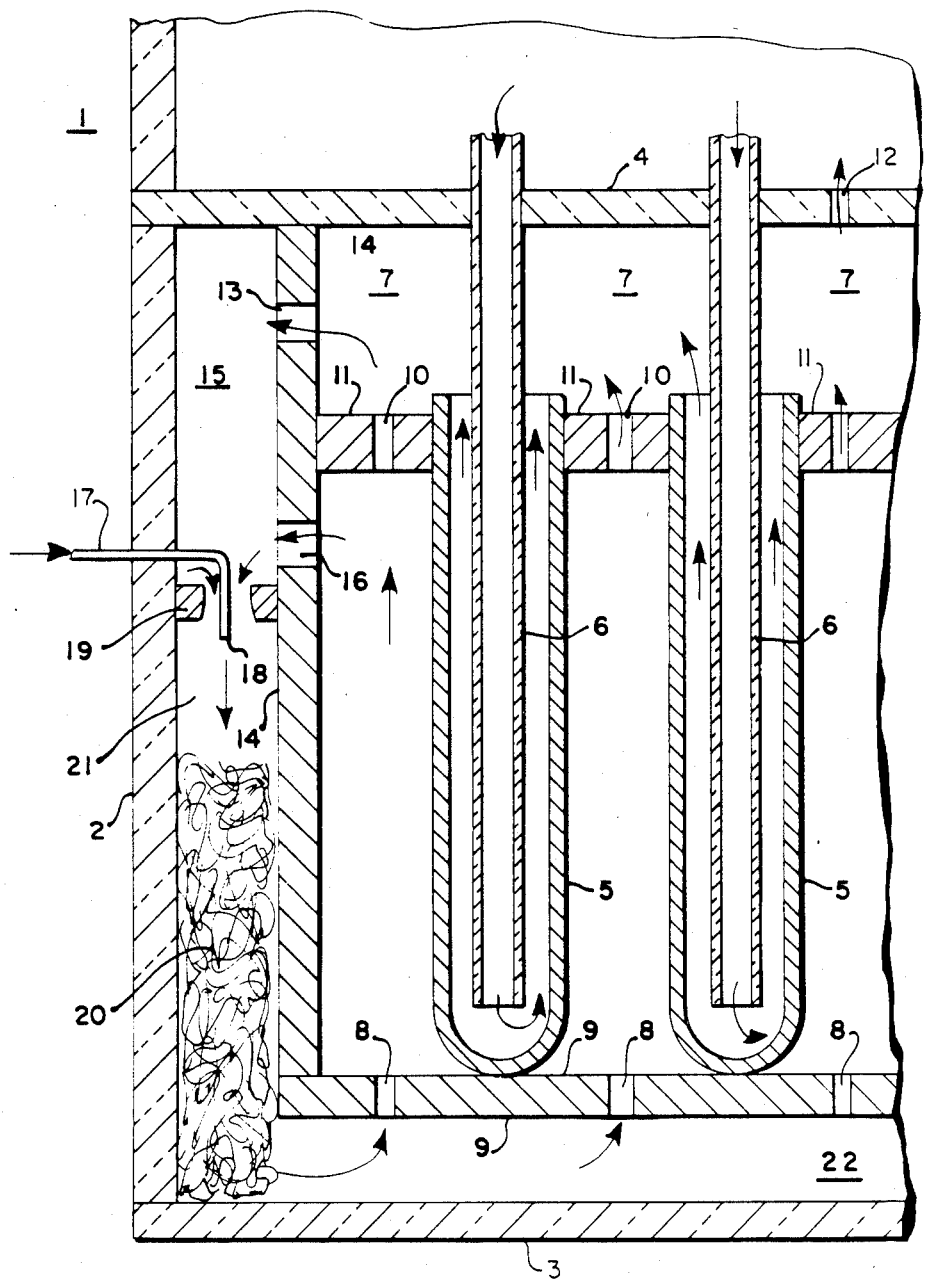

REFORMING OF FUEL INSIDE FUEL CELL GENERATOR

The Government of the United States of America has rights in this invention pursuant to Contract No. DE-AC0280E7-17089 awarded by the U.S. Department of Energy.

BACKGROUND OF THE INVENTION

In a high temperature solid oxide fuel cell, air and a fuel are combined to form heat and electricity. Because fuels such as methane and alcohol can, under certain conditions, form carbon or soot at the very high temperatures at which these fuel cells operate, and carbon and soot can reduce the efficiency of the fuel cell, the fuels that can be used in the cell have generally been limited to carbon monoxide and hydrogen. The carbon monoxide and hydrogen can be obtained by reforming fuels such as methane, ethane, and alcohols. Reforming is a process in which the reformable fuel is combined with water and/or carbon dioxide to produce carbon monoxide and hydrogen. For example, the reforming of methane and ethane using water and carbon dioxide are given by the following equations:

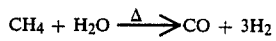

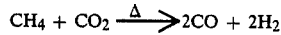

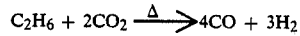

The reformed fuel is then used in the solid oxide fuel cell. Since reforming is an endothermic process, additional thermal energy must be supplied either by direct combustion or by heat transfer through the walls of a heat exchanger.

Until now, the reforming of the fuel had to be performed outside of the fuel cell generator because no one had discovered how this chemical process could be performed within the generator structure itself. Reforming outside of the fuel cell generator required the use of heat exchangers, pumps, and other types of equipment. U.S. Pat. No. 4,128,700, for example, illustrates the reforming of a fuel outside of the fuel cell generator. The reforming of fuel outside the generator is undesirable as it results in a loss of energy as heat in the reformer and in conduits between the generator and the reformer, and the apparatus is more complicated, requires more space, and is more expensive.

SUMMARY OF THE INVENTION

I have discovered that a reformable gaseous fuel can be reformed within a fuel cell generator if the partially spent fuel stream from the fuel cells is divided into two streams. One stream is combined with the partially spent air stream to form an exhaust stream. A portion of the exhaust stream is then vented while the remaining portion of exhaust stream is combined with the other portion of the partially spent fuel stream. That combined stream is then mixed with the gaseous reformble fuel. By dividing and recombining these streams in this way, I am able to obtain the amount of energy as heat that is required in the reformation process, and, at the same time, I obtain the appropriate amount of water and carbon dioxide that is required to reform the fuel. In this way, the fuel is reformed inside the solid oxide fuel cell generator. As a result, no heat is lost in processes that occur outside the generator and the entire process of converting the fuel into electricity is more efficient. The method and apparatus of this invention are relatively simple and inexpensive and do not require much room within the fuel cell generator. Other advantages will, no doubt, occur to those skilled in the art.

DESCRIPTION OF THE INVENTION

The accompanying drawing is a side view in section illustrating a certain presently preferred embodiment of a solid oxide fuel cell generator incorporating the improvements of this invention.

In the drawing, a refractory container 1 is formed of walls 2, base 3, and inlet air manifold 4. Within refractory container 1 are a multiplicity of solid oxide fuel cells 5. Each cell consists of an air electrode on the inside, an electrolyte in the middle, and a fuel electrode on the outside. (Details of the cell construction are not shown but can be found in U.S. Pat. Nos. 4,520,082, 4,395,468, and 4,562,124, herein incorporated by reference.) An air feed tube 6 passes through inlet air manifold 4 to the bottom of each cell. Oxygen in the air passes through the fuel cell material as oxygen ions to the outside of the tube where the oxygen ions react with fuel, generating electricity and heat. Spent or unreacted air passes into exhaust plenum 7. Fuel enters through apertures 8 in fuel plenum 9 and passes around the outside of the tube moving upward in the drawing. The spent fuel is divided into two streams, one of which passes through apertures 10 in exhaust manifold 11 into exhaust plenum 7 where it mixes with the partially spent air stream, resulting in the burning of the fuel. A portion of the exhaust gases in the exhaust plenum 7 pass through aperture 12 in inlet air manifold 4 where they are vented. The remaining portion of the exhaust gases in exhaust plenum 7 pass through aperture 13 in dividing wall 14 to mixing chamber 15. The other portion of the spent fuel passes through aperture 16 in dividing wall 14 into mixing chamber 15, where it is mixed with that portion of the exhaust gases. A reformable gaseous fuel enters through tube 17 and passes through nozzle 18 past barrier 19. Nozzle 18 and barrier 19 form a jet stream which results in the injection of the reformable fuel into the gases in mixing chamber 15 and draws the gases from mixing chamber 15 into the catalytic packing 20 in catalyst chamber 21. Here, the reformable fuel is reformed to form carbon monoxide and hydrogen. The carbon monoxide and hydrogen pass into the fuel plenum 22, then through the apertures 8 in fuel distribution block 9, completing the cycle.

Any reformable gaseous fuel can be used in the process and apparatus of this invention, including hydrocarbons such as methane, ethane, and propane, as well as alcohols such as methanol. The preferred fuel is natural gas which consists primarily of methane, because it is inexpensive. The reforming of these fuels can be performed without a catalyst, but a catalyst is preferably present as the reaction is too slow without a catalyst. Common catalysts include finally divided nickel and platinum; nickel is preferred because it is much less expensive than platinum.

The injection of the raw fuel into the mixed gases can occur in a variety of ways, but a jet pump is preferable because the very high temperatures in the solid oxide fuel cell make other means of injection more expensive and troublesome. A jet pump works on the well known Venturi principle where the barrier 19 in the drawing is aerodynamically shaped so that the mixed gases are drawn along with the fuel.

The ratio of the division of the partially spent fuel which passes directly into the mixing chamber or into the exhaust plenum depends upon the particular reformable fuel being used. The general principle is that the greater the proportion of partially spent fuel that passes into the exhaust gas chamber, the higher will be the temperature, and the more water that will be present. Thus, the relative size of apertures 10 and 16 is adjusted so that the amount of water that enters the mixing chamber 15 is stoichiometric or in excess of the amount that is stoichiometrically required to reform the particular fuel that is being used. Because the combustion that occurs in the exhaust plenum releases heat, if more of the spent fuel is sent to the exhaust plenum, the temperature of the gases in the mixing chamber will be higher. Thus, the temperature required to reform the particular fuel being used can be attained by adjusting the size of apertures 10 and 13; other means of controlling the relative magnitude of the different streams, such as by using valves, is also contemplated. If the fuel is methane, for example, about ¼ to about ⅓ of the volume of the partially spent fuel should be returned to the mixing chamber, either directly or after it has been reacted with the partially spent air stream. The calculation of the ratios of the various streams is within the skill of a person having ordinary skill in the art. For about a 75% fuel utilization and about a 25% oxidant utilization in the generator proper, about 15 to about 25% by volume of the spent fuel is typically sent directly to the mixing chamber and about 75 to about 85% by volume is sent to the exhaust plenum, and the spent fuel in the exhaust plenum typically contains about 10 to about 20% by volume of unreacted oxidant.

I claim:

1. In a solid oxide fuel cell generator having a plurality of individual fuel cells in a refractory container, where said fuel cells generate a partially spent fuel stream and a partially spent oxidant stream, an improved method of reforming a gaseous reformable fuel within said container comprising
   (A) dividing said partially spent fuel stream into two streams, spent fuel steam I and spent fuel stream II;
   (B) burning spent fuel stream I with said partially spent oxidant stream inside said refractory container to produce an exhaust stream;
   (C) dividing said exhaust stream into two streams, exhaust stream I and exhaust stream II;
   (D) venting exhaust stream I;
   (E) mixing exhaust stream II with spent fuel stream II for form a recycle stream;
   (F) mixing said recycle stream with said gaseous reformable fuel within said refractory container to form a fuel stream; and
   (G) supplying said fuel stream to said fuel cells.

2. A method according to claim 1 wherein said gaseous reformable fuel is mixed with said recycle stream through a jet pump, where said fuel is at a higher pressure.

3. A method according to claim 1 wherein said gaseous reformable fuel is natural gas.

4. A method according to claim 1 wherein said fuel stream passes through a catalytic packing before it is supplied to said fuel cells.

5. A method according to claim 4 wherein said catalytic packing is nickel.

6. A method according to claim 1 wherein exhaust stream I is about ⅔ to about ¾ of the volume of said spent fuel stream.

7. A method according to claim 1 wherein the fuel utilization in said generator is about 75% and the oxidant utilization is about 25%.

8. A method according to claim 1 wherein said spent fuel stream I is about 75 to about 85% of said partially spent fuel stream, and said spent fuel stream II is about 15 to about 25% of said partially spent fuel stream.

9. A method according to claim 1 wherein exhaust stream II is about 10 to about 20% by volume oxidant.

10. In a solid oxide fuel cell generator having a plurality of individual fuel cells in a refractory container, and having a combustion chamber where a partially spent fuel stream and a partially spent oxidant stream are combined and burned to form an exhaust gas, and said exhaust gas is vented from said refractory container, an improvement which permits the reforming of a reformable gaseous fuel within said refractory container, said improvement comprising
    (A) a mixing chamber within said refractory container;
    (B) means for diverting a portion of said partially spent fuel stream to said mixing chamber instead of to said combustion chamber;
    (C) means for diverting a portion of said exhaust gas to said mixing chamber where it is mixed with said portion of said partially spent fuel stream to form a recycle stream;
    (D) means for injecting said reformable gaseous fuel into said recycle stream; and
    (E) means for circulating said recycle stream to said fuel cells.

11. An improvement according to claim 10 wherein said means for injecting said reformable gaseous fuel into said recycle stream is a jet pump.

12. An improvement according to claim 10 wherein said mixing chamber adjoins said combustion chamber, and said means for diverting a portion of said exhaust gas to said mixing chamber is an aperture therebetween.

13. An improvement according to claim 10 wherein said fuel cells are vertically suspended tubes sealed at the bottom, and said combustion chamber is at the top of said tubes.

* * * * *